United States Patent
van Ek et al.

(10) Patent No.: US 6,385,016 B1
(45) Date of Patent: May 7, 2002

(54) MAGNETIC READ HEAD WITH AN INSULATOR LAYER BETWEEN AN MR SENSOR AND REAR PORTIONS OF CURRENT CONTACTS TO PROVIDE ENHANCED SENSITIVITY

(75) Inventors: Johannes van Ek, Minnetonka; Martin L. Plumer, Bloomington; Richard P. Michel, Minneapolis; Michael C. Kautzky, Eagan; Dimitar V. Dimitrov, Edina, all of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 63 days.

(21) Appl. No.: 09/660,087

(22) Filed: Sep. 12, 2000

Related U.S. Application Data

(60) Provisional application No. 60/193,538, filed on Mar. 31, 2000.

(51) Int. Cl.⁷ .............................................. G11B 5/39
(52) U.S. Cl. ...................................... 360/322; 360/320
(58) Field of Search ............................ 360/320, 322, 360/317, 324.1, 324.11, 324.12

(56) References Cited

U.S. PATENT DOCUMENTS

| | | | |
|---|---|---|---|
| 4,782,414 A | 11/1988 | Krounbi et al. | 360/113 |
| 5,206,590 A | 4/1993 | Dieny et al. | 324/252 |
| 5,301,079 A | 4/1994 | Cain et al. | 360/113 |
| 5,313,186 A | 5/1994 | Schuhl et al. | 338/32 R |
| 5,568,335 A * | 10/1996 | Fontana et al. | 360/322 |
| 5,731,937 A | 3/1998 | Yuan | 360/113 |
| 5,739,988 A | 4/1998 | Gill | 360/113 |
| 5,764,445 A | 6/1998 | Torng et al. | 360/113 |
| 5,831,426 A | 11/1998 | Black, Jr. et al. | 324/127 |
| 5,850,324 A * | 12/1998 | Wu et al. | 360/320 |
| 5,893,981 A | 4/1999 | Dovek et al. | 216/22 |
| 5,907,459 A * | 5/1999 | Shouji et al. | 360/322 |
| 5,909,344 A | 6/1999 | Gill | 360/113 |
| 5,999,379 A | 12/1999 | Hsiao et al. | 360/113 |
| 6,031,691 A * | 2/2000 | Onuma et al. | 360/320 |
| 6,040,962 A | 3/2000 | Kanazawa et al. | 360/113 |
| 6,130,810 A * | 10/2000 | Shibata et al. | 360/322 |

FOREIGN PATENT DOCUMENTS

| | | | |
|---|---|---|---|
| EP | 0 675 371 A2 | 3/1995 | G01R/33/09 |
| EP | 0 690 438 A2 | 6/1995 | G11B/5/39 |
| JP | 05 159 242 | 12/1991 | G11B/5/39 |
| JP | 06 325 329 | 12/1993 | G11B/5/39 |
| JP | 07 244 822 | 3/1994 | G11B/5/39 |
| JP | 11-175918 | * 7/1999 | |

* cited by examiner

*Primary Examiner*—Jefferson Evans
(74) *Attorney, Agent, or Firm*—McKinney & Lange, P.A.

(57) ABSTRACT

A magnetic read head having an air bearing surface, a magnetoresistive sensor, an insulator layer, and first and second current contacts. The magnetoresistive sensor has a first portion adjacent to the air bearing surface and a second portion distal from the air bearing surface. The first and second current contacts are positioned in electrical contact with opposite edges of the first portion of the magnetoresistive sensor, and the insulator layer is positioned between the second portion of the magnetoresistive sensor and each of the first and second current contacts.

9 Claims, 4 Drawing Sheets

MAGNETIC READ HEAD WITH AN INSULATOR LAYER BETWEEN AN MR SENSOR AND REAR PORTIONS OF CURRENT CONTACTS TO PROVIDE ENHANCED SENSITIVITY

CROSS-REFERENCE TO RELATED APPLICATION

This Application claims priority from provisional application No. 60/193,538 filed on Mar. 31, 2000 for "Enhanced Sensitivity In Magnetoresistive Devices" of Johannes van Ek, Martin Louis Plumer, Richard Paul Michel, Michael Christopher Kautzky, and Dimitar Velikov Dimitrov.

BACKGROUND OF THE INVENTION

The present invention relates generally to the field of magnetic data storage and retrieval systems. In particular, the present invention relates to a magnetic read head for use in a magnetic data retrieval system that has a magnetoresistive read sensor with an extended sensing layer to increase its read sensitivity.

Magnetic read heads are positioned over a magnetic disc that is rotated at a high speed. The heads are supported over a surface of the magnetic disc by a thin cushion of air produced by the high rotational speed. This surface is called an air bearing surface. The magnetic read head retrieves magnetically-encoded information that is stored on the disc, and is typically formed of several layers that include a top shield, a bottom shield, and a magnetoresistive read sensor positioned between the top and bottom shield.

A time-dependent magnetic field from the disc directly modulates a resistivity of the read sensor by causing a magnetization of the read sensor to rotate. The change in resistance of the read sensor can be detected by passing a sense current through, and measuring the voltage across, the read sensor. The resulting signal can be used to recover encoded information from the disc.

The top and bottom shields are generally placed on either side of the read sensor to ensure that the read sensor reads only that information which is stored directly beneath it on the magnetic disc. Regular increases in areal densities of magnetic media have made it necessary to regularly decrease the spacing between the shields positioned on either side of the read sensor. This decrease in spacing between the shields has had the negative effect of decreasing the efficiency and read sensitivity of the read sensor, since magnetic flux emanating from the disc reaches a smaller portion of the read sensor.

This decrease in efficiency can be counteracted by decreasing a stripe height of the read sensor, that is, a length of the read sensor along its side normal to the air bearing surface. However, decreasing the stripe height of the read sensor increases the effects of self-demagnetization fields acting on the sensor. The self-demagnetization fields are a consequence of poles generated at a front (near the air bearing surface) and back of the sensor. These fields decrease the read sensitivity of the sensor by decreasing the amount of rotation of the magnetization of the sensor when acted upon by a magnetic field from the disc. An increased stripe height can substantially minimize the effects of these self-demagnetization fields.

Therefore, there is a need for a magnetic read sensor having an increased stripe height to minimize these self-demagnitization effects and to minimize current shunting away from a sensing portion of the sensor.

BRIEF SUMMARY OF THE INVENTION

The present invention is a magnetic read head having an air bearing surface, a magnetoresistive sensor, an insulator layer, and first and second current contacts. The magnetoresistive sensor has a first portion adjacent to the air bearing surface and a second portion distal from the air bearing surface. The first and second current contacts are positioned in electrical contact with opposite edges of the first portion of the magnetoresistive sensor, and the insulator layer is positioned between the second portion of the magnetoresistive sensor and each of the first and second current contacts. The first portion of the magnetoresistive sensor functions primarily as an electrically active region and the second portion of the magnetoresistive sensor functions primarily as an electrically inactive region.

The magnetic read head of the present invention minimizes both a self-demagnetizing effect of the magnetoresistive sensor and current shunting away from a sensing portion of the magnetoresistive sensor. The magnetic read head thereby achieves an enhanced read sensitivity.

DETAILED DESCRIPTION

Figure 1:
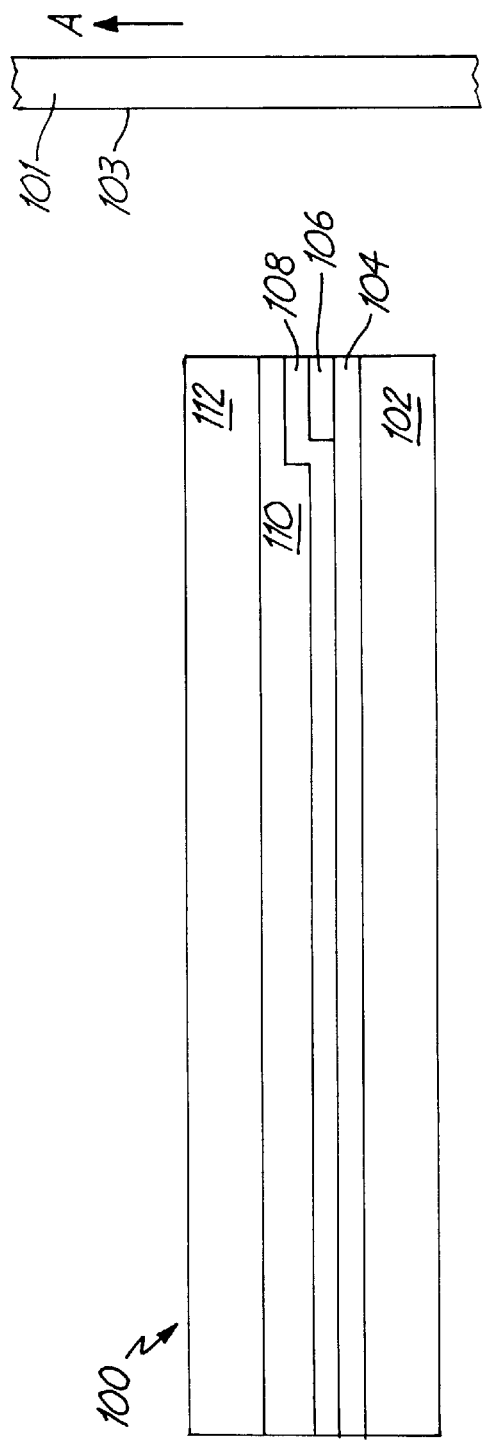
FIG. 1 is a cross-sectional view of a magnetic read head of the prior art taken along a plane normal to an air bearing surface of the magnetic read head.

FIG. 1 is a cross-sectional view of magnetic read head 100 of the prior art taken along a plane normal to an air bearing surface (ABS) of magnetic read head 100. The ABS of magnetic read head 100 faces disc surface 103 of magnetic disc 101. Magnetic disc 101 rotates in a direction relative to magnetic read head 100 as indicated by arrow A. Spacing between the ABS of magnetic read head 100 and disc surface 103 is preferably minimized while avoiding contact between magnetic read head 106 and magnetic disc 101.

Figure 2:
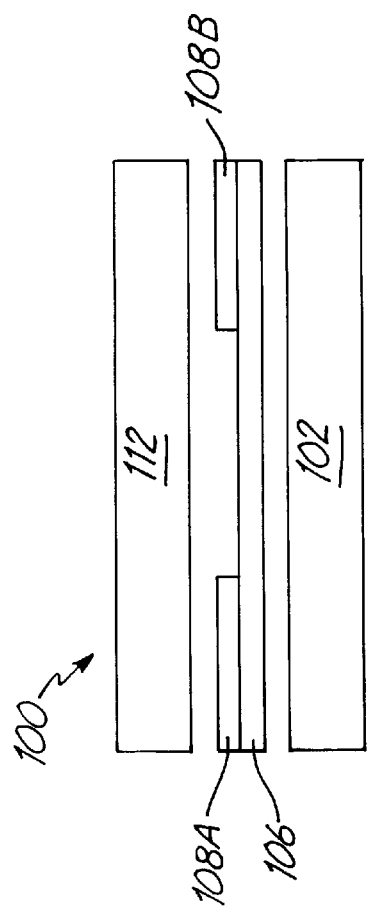
FIG. 2 is a layer diagram of a plurality of magnetically significant elements along the air bearing surface of the magnetic read head of FIG. 1.

FIG. 2 is a layer diagram of a plurality of magnetically significant elements along the ABS of magnetic road head 100. For clarity, all spacing and insulating layers are omitted from FIG. 2.

As shown in FIGS. 1 and 2, magnetic read head 100 includes bottom shield 102, first half gap 104, magnetoresistive (MR) sensor 106, metal contact layer 108, second half gap 110, and top shield 112. MR sensor 106 is positioned adjacent to the ABS between bottom shield 102 and top shield 112. More specifically, MR sensor 106 is positioned between terminating ends of first half gap 104 and metal contact layer 108. Metal contact layer 108 is positioned between first half gap 104 and second half gap 110. MR sensor 106 has two passive regions positioned adjacent to metal contacts 108A and 108B. An active region of MR sensor 106 is located between the two passive regions of MR sensor 106. This active region defines a sensor width.

In operation of magnetic read head 100, magnetic field from disc surface 103 of disc 101 causes a rotation of the magnetization vector of a sensing layer of MR sensor 106, which in turn causes a change in electrical resistivity of MR sensor 106. This change in resistivity can be detected by passing a current through MR sensor 106 via metal contact layer 108 and measuring a voltage across MR sensor 106. External circuitry then converts the voltage information into an appropriate format and manipulates that information as necessary.

Figure 3:
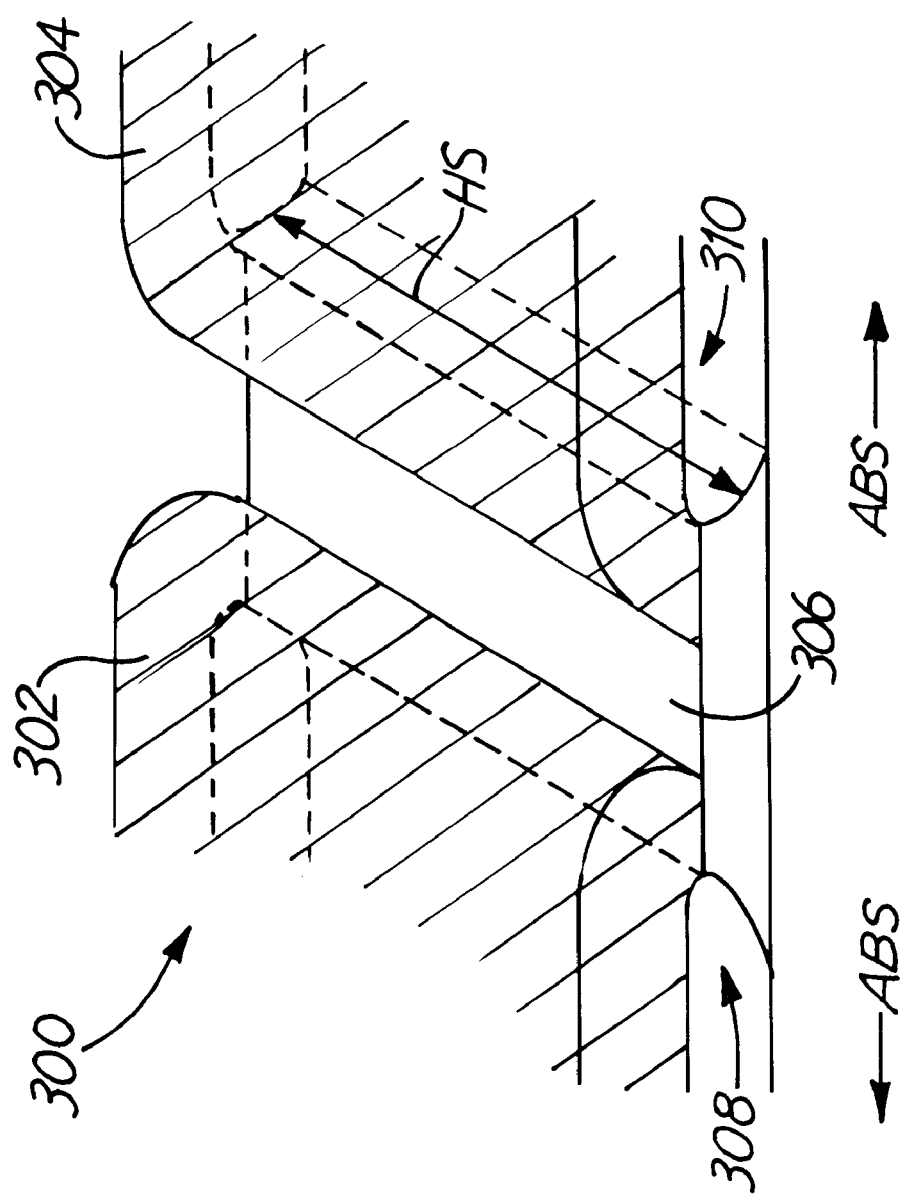
FIG. 3 is a perspective view of a magnetic read head of the prior art.

FIG. 3 is a perspective view of magnetic read head 300 of the prior art. An air bearing surface (ABS) of magnetic read head 300 is also shown. Magnetic read head 300 includes first current contact 302, second current contact 304, MR sensor 306, first permanent magnet 308, and second permanent magnet 310. Stripe height HS is a height of MR sensor 306 in a direction normal to the ABS of magnetic read head 300. Stripe height HS measures a magnetically active height of MR sensor 306. MR sensor 306 forms an abutting junction with each of first and second permanent magnets 308 and 310. These permanent magnets provide vertical biasing for MR sensor 306. However, other variations of the prior art employ other forms of vertical biasing of MR sensor 306 (such as the shunt current or soft adjacent layer biasing methods). First current contact 302 and second current contact 304 are positioned in electrical contact with opposite edges of MR sensor 306. Decreasing stripe height HS of MR sensor 306 will increase the effects of self-demagnetization fields acting on MR sensor 306. The self-demagnetization fields are a consequence of poles generated at both the front (near the ABS) and back of MR sensor 306. Increasing stripe height HS can minimize the effects of the self-demagnetization fields. However, magnetic flux from a magnetic medium positioned near the ABS shows weak propagation into a back portion of MR sensor 306 that has large stripe height HS. Because electrical current continues to flow through the back portion of MR sensor 306, however, a portion of the total driven current through first and second current contacts 302 and 304 is effectively shunted away from a more magnetically active region near the front of MR sensor 306. This current shunting reduces the efficiency of MR sensor 306, thereby limiting the ability to increase stripe height HS of MR sensor 306 of the prior art.

Figure 4:
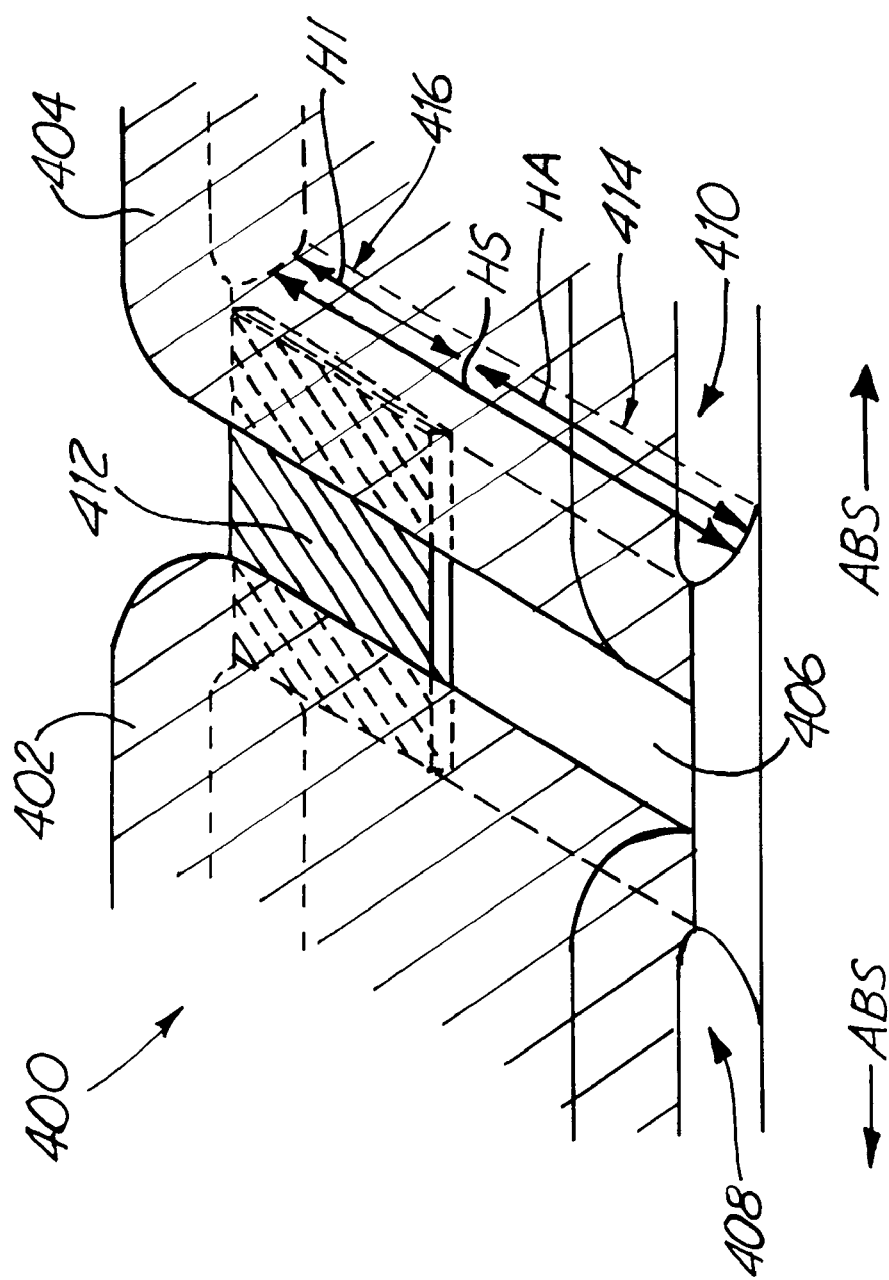
FIG. 4 is a perspective view of a magnetic read head in accord with the present invention.

FIG. 4 is a perspective view of magnetic read head 400 in accord with the present invention. An air bearing surface (ABS) of magnetic read head 400 is also shown. Magnetic read head 400 includes first current contact 402, second current contact 404, MR sensor 406, first permanent magnet 408, second permanent magnet 410, and insulator 412. Stripe height HS is a height of MR sensor 406 in a direction normal to the ABS of magnetic read head 400. Stripe height HS measures a magnetically active height of MR sensor 406. Height HA is a height of a first portion 414 of MR sensor 406 that is adjacent to the ABS. Height HI is a height of a second portion 416 of MR sensor 406 that is distal from the ABS. MR sensor 406 is positioned between first permanent magnet 408 and second permanent magnet 410. First and second current contacts 402 and 404 are positioned in electrical contact with opposite edges of first portion 414 of MR sensor 406. Insulator 412 is positioned between second portion 416 of MR sensor 406 and each of first and second current contacts 402 and 404. The preferred embodiment implements the use of first and second permanent magnets 408 and 410 to provide a vertical biasing of MR sensor 406.

However, alternate embodiments employ other forms of vertical biasing of MR sensor 406 (such as the shunt current or soft adjacent layer biasing methods).

Common embodiments of MR sensor 406 include anisotropic magnetoresistive (AMR) sensors and giant magnetoresistive (GMR) sensors. In an AMR sensor manifesting the AMR effect, a resistance of the sensor varies as the square of the cosine of the angle between the magnetization in the sensor and the direction of sensed current flow through the sensor. An external magnetic field from a recorded magnetic disc causes a change in the direction of magnetization in the sensor, thereby causing a change in the resistance of the sensor and a corresponding change in the sensed current or voltage. The resistance is highest when the magnetization of the sensor is parallel to the current and lowest when the magnetization of the sensor is perpendicular to the current. In a GMR sensor manifesting the GMR effect, a resistance of the sensor varies as a function of a spin-dependent transmission of conduction electrons between magnetic layers that are separated by a nonmagnetic layer. An accompanying spin-dependent scattering takes place at the interface of the magnetic and nonmagnetic layers, and also within the magnetic layers. GMR sensors that have only two magnetic layers separated by a nonmagnetic layer are generally referred to as spin valve sensors. In these sensors, the magnetic layers are made of a ferromagnetic material. One of the magnetic layers is called the pinned layer, and typically its magnetization is pinned by exchange coupling with an antiferromagnetic material. The other magnetic layer of a spin valve sensor is called the free layer, and its magnetization is free to rotate in response to fields from a recorded magnetic disc. A spin valve effect of the sensor varies as the cosine of the angle between the magnetization of the pinned layer and the magnetization of the free layer. Recorded information can be read from a magnetic disc because an external magnetic field from the disc causes a change in the direction of the magnetization of the free layer, thereby causing a change in the resistance of the sensor and a corresponding change in the sensed current or voltage.

Because insulator 412 is positioned between second portion 416 of MR sensor 406 and each of first and second current contacts 402 and 404, first portion 414 of MR sensor 406 functions primarily as an electrically active region and second portion 416 of MR sensor 406 functions primarily as an electrically inactive region. Current density is highest in first portion 414 of MR sensor 406 and significantly decreases in second portion 416. Thus, current shunting into second portion 416 is minimal. In addition, the total amount of current that can be driven through MR sensor 406 of the present invention is higher because of greater heat dissipation through second portion 416. A higher total current flow driven through MR sensor 406 will thus maximize current density in first portion 414 of MR sensor 406. Because MR sensor 406 functions magnetically, however, with stripe height HS, self-demagnitizing effects of MR sensor 406 are minimized.

Figure 5:
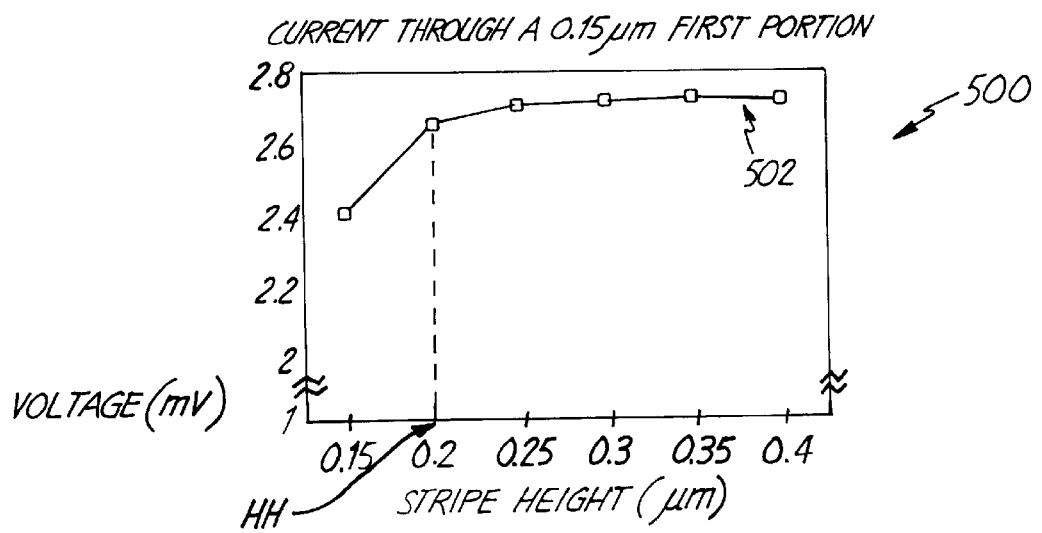
FIG. 5 is a graph illustrating a first voltage response (voltage versus stripe height) of the magnetic read head of the preferred embodiment of the present invention.

FIG. 5 is a graph illustrating a first voltage response (voltage versus stripe height) of the magnetic read head of the preferred embodiment of the present invention. FIG. 5 shows a first example of a typical voltage response, in which a constant current of 3 milliamps was driven through MR sensor 406 having a width of 0.2 micrometers. First portion 414 of MR sensor 406 has a height HA of 0.15 micrometers. A horizontal axis measures a stripe height of MR sensor 406 in micrometers, and a vertical axis measures an absolute value of a voltage across MR sensor 406 in millivolts.

Graphical view 500 shows a voltage response curve 502 of MR sensor 406 for a peak-to-peak source signal. Saturation height HH is a value of a stripe height at which curve 502 shows maximum output gain. A stripe height greater than saturation height HH will not result in either appreciable output gain or loss. However, extending the stripe height will increase the size of the second portion 416 of MR sensor 406 to optimize heat dissipation. Thus, one skilled in the art can select a stripe height to maximize both output gain and heat dissipation. As a result, the self-demagnetizing effects of MR sensor 406 are minimized.

Figure 6:
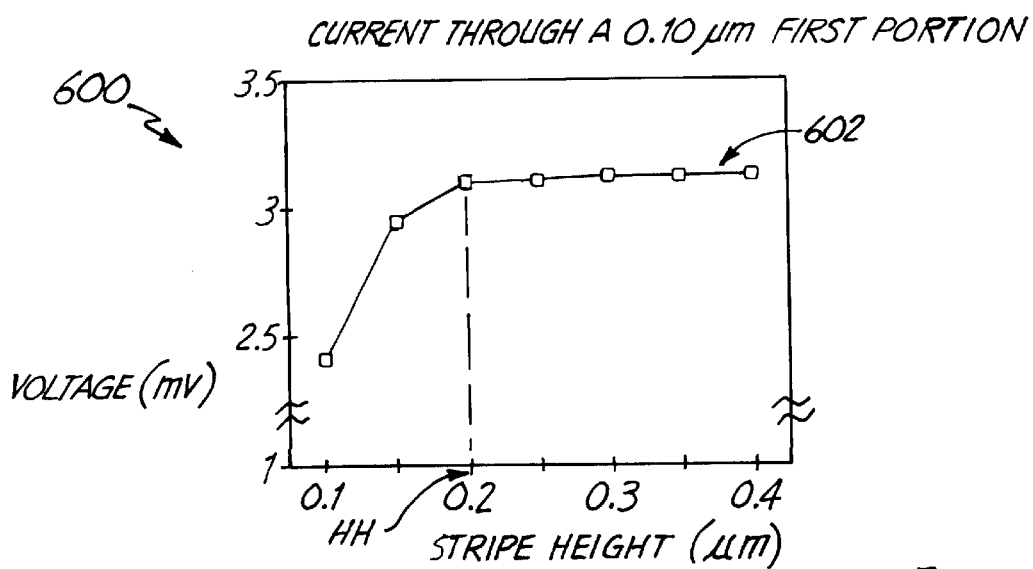
FIG. 6 is a graph illustrating a second voltage response (voltage versus stripe height) of the magnetic read head of the preferred embodiment of the present invention.

FIG. 6 is a graph illustrating a second voltage response (voltage versus stripe height) of the magnetic read head of the preferred embodiment of the present invention. FIG. 6 shows a second example of a typical voltage response, in which a constant current of 2 milliamps was driven through MR sensor 406 having a width of 0.2 micrometers. First portion 414 of MR sensor 406 has a height HA of 0.10 micrometers. A horizontal axis measures a stripe height of MR sensor 406 in micrometers, and a vertical axis measures an absolute value of a voltage across MR sensor 406 in millivolts. Graphical view 600 shows a voltage response curve 602 of MR sensor 406 for a peak-to-peak source signal. Saturation height HH is a value of a stripe height at which curve 602 shows maximum output gain. A stripe height greater than saturation height HH will not result in either appreciable output gain or loss. However, extending the stripe height will increase the size of the second portion 416 of MR sensor 406 to optimize heat dissipation. Thus, one skilled in the art can select a stripe height to maximize both output gain and heat dissipation. As a result, the self-demagnetizing effects of MR sensor 406 are minimized.

Thus, the present invention addresses the problem of a self-demagnetizing effect of an MR sensor of the prior art. The magnetic read head of the present invention has an MR sensor with an insulator layer to minimize both the self-demagnetizing effect of the MR sensor and the current shunting away from a sensing portion of the MR sensor. The magnetic read head of the present invention thereby achieves an enhanced read sensitivity.

Although the present invention has been described with reference to preferred embodiments, workers skilled in the art will recognize that changes may be made in form and detail without departing from the spirit and scope of the invention.

What is claimed is:

1. A magnetic data storage and retrieval system comprising:
   a read head having a magnetoresistive sensor and first and second current contacts positioned in electrical contact with opposite edges of the magnetoresistive sensor; and
   means for minimizing a self-demagnetizing effect of the magnetoresistive sensor.

2. The magnetic read head of claim 1 wherein the magnetoresistive sensor is an anisotropic magnetoresistive sensor.

3. The magnetic read head of claim 1 wherein the magnetoresistive sensor is a giant magnetoresistive sensor.

4. A magnetic read head having an air bearing surface and comprising:
   a magnetoresistive sensor having a first portion adjacent to the air bearing surface and a second portion distal from the air bearing surface;
   first and second current contacts positioned in electrical contact with opposite edges of the first portion of the magnetoresistive sensor; and
   an insulator layer positioned between the second portion of the magnetoresistive sensor and each of the first and second current contacts.

5. The magnetic read head of claim 4 wherein the magnetoresistive sensor is an anisotropic magnetoresistive sensor.

6. The magnetic read head of claim 4 wherein the magnetoresistive sensor is a giant magnetoresistive sensor.

7. In a magnetic read head comprised of a magnetoresistive sensor and first and second current contacts, wherein the magnetoresistive sensor has a first portion adjacent to an air bearing surface of the magnetic read head and a second portion distal from the air bearing surface, and wherein the first and second current contacts are positioned in electrical contact with opposite edges of the first portion of the magnetoresistive sensor, an improvement comprising an insulator layer positioned between the second portion of the magnetoresistive sensor and each of the first and second current contacts, such that the first portion of the magnetoresistive sensor functions primarily as an electrically active region and the second portion of the magnetoresistive sensor functions primarily as an electrically inactive region.

8. The magnetic read head of claim 7 wherein the magnetoresistive sensor is an anisotropic magnetoresistive sensor.

9. The magnetic read head of claim 7 wherein the magnetoresistive sensor is a giant magnetoresistive sensor.

* * * * *

UNITED STATES PATENT AND TRADEMARK OFFICE
CERTIFICATE OF CORRECTION

PATENT NO. : 6,385,016 B1
DATED : May 7, 2002
INVENTOR(S) : Johannes van Ek et al.

It is certified that error appears in the above-identified patent and that said Letters Patent is hereby corrected as shown below:

<u>Title page,</u>
Item [54], title delete "MAGNETIC READ HEAD WITH AN INSULATOR LAYER BETWEEN AN MR SENSOR AND REAR PORTIONS OF CURRENT CONTACTS TO PROVIDE ENHANCED SENSITIVITY" insert -- A MAGNETIC READ HEAD WITH ENHANCED SENSITIVITY --
Item [74], delete "McKinney", insert -- Kinney --

<u>Column 2,</u>
Line 52, delete "106", insert -- 100 --
Line 54, delete "road", insert -- read --

Signed and Sealed this

Twenty-fourth Day of September, 2002

Attest:

JAMES E. ROGAN
Attesting Officer  Director of the United States Patent and Trademark Office